(No Model.)
J. B. STOBAEUS & F. C. WACKENHUTH.
METHOD OF AND APPARATUS FOR CARBONATING BEER.
No. 478,176. Patented July 5, 1892.
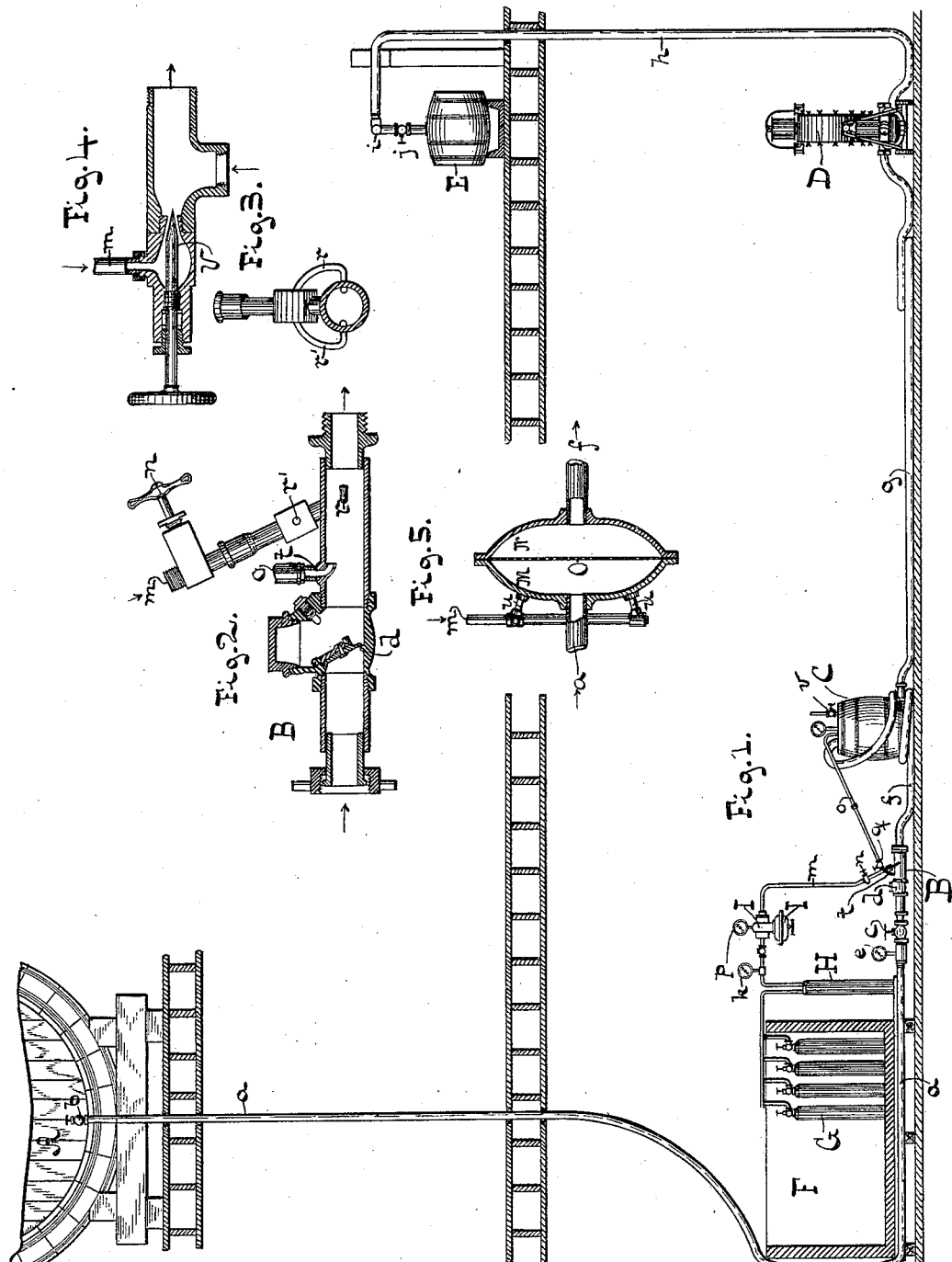
WITNESSES:
INVENTORS
John B. Stobaeus
Frederick C. Wackenhuth
BY
ATTORNEY

UNITED STATES PATENT OFFICE.

JOHN B. STOBAEUS AND FREDERICK C. WACKENHUTH, OF NEWARK, NEW JERSEY, ASSIGNORS TO THE UNIVERSAL CARBONATING COMPANY, OF SAME PLACE.

METHOD OF AND APPARATUS FOR CARBONATING BEER.

SPECIFICATION forming part of Letters Patent No. 478,176, dated July 5, 1892.

Application filed March 25, 1892. Serial No. 426,390. (No model.)

*To all whom it may concern:*

Be it known that we, JOHN B. STOBAEUS and FREDERICK C. WACKENHUTH, citizens of the United States, residing at Newark, county of Essex, State of New Jersey, have invented certain new and useful Improvements in Methods of and Apparatus for Carbonating Beer, of which the following is a specification.

Our invention consists in a new and improved method of carbonating beer and other malt liquors and apparatus for carrying on the same.

The methods and apparatus heretofore used for the manufacture of carbonated beverages are not suitable for brewing purposes, the conditions and result to be obtained being very different. While the usual carbonated beverages are fully saturated at a comparatively high pressure, substantially the pressure maintained within the vessels from which the beverages are to be dispensed, we have found it to be essential that the beer as it comes from the ruh-cask or other receptacle should when carbonic acid is injected into it be at a pressure higher than the ultimate pressure in the kegs into which it is filled and that the supply of carbonic acid should be less than what is required to fully saturate the beer under the conditions of temperature and pressure at the place of injection, so that when finally the pressure is reduced and the beer filled into kegs it shall be in the proper condition, shall not foam too much, and that the final pressure in the kegs shall be about five to eight pounds. Excessive foaming of the beer, due to surcharge of carbonic acid, is particularly objectionable when the beer is to be drawn into bottles from the kegs. The method of impregnation to be suitable for breweries must be such that very large quantities of beer can be treated in a very short time, as fast as the beer is racked into kegs—about twenty-five barrels per hour with one apparatus.

In carrying out our invention we use by preference apparatus substantially such as shown in the annexed drawings, in which—

Figure 1 is a front elevation of a complete apparatus partly in section. Fig. 2 is a longitudinal elevation of the charger B in Fig. 1; Fig. 3, a cross-section of the charger. Figs. 4 and 5 show other forms of chargers.

Similar letters indicate corresponding parts.

In Fig. 1 the letter A designates a cask for supplying ruh-beer under pressure to a carbonic-acid charger B; $a$, a pipe or hose leading from the cask A to the charger B; $b$ and $c$, valves; $d$, a check-valve, and $e$ a gage to indicate the pressure at the charger B.

C is a separating vessel or cask; $f$, a hose leading from the charger B to the top of the separator C; D, a filter of the usual construction, connected with the lower part of the cask C by a hose $g$. From the filter D a hose or pipe $h$ leads to the double racking-pipes $i$, with valves or cocks $j$, through which the beer is passed into kegs E.

F is a tank to receive cylinders G, containing liquid carbonic acid, the tank to be filled with water at a temperature of about 70° Fahrenheit to prevent freezing of the carbonic acid when drawn off rapidly. Several cylinders G are by preference together connected to a receiver H, with pressure-gage K, and thence with a reducing-valve I, with pressure-gage $p$. A pipe or tube $m$, with valve $n$, leads the gaseous carbonic acid from the reducing-valve to the charger B. We show apparatus adapted to the use of liquid carbonic acid to supply the carbonic-acid gas. It is manifest, however, that carbonic acid may be supplied from any other suitable source under sufficient pressure.

Figs. 2 and 3 show the charger B, Fig. 1, on a larger scale. As shown in these figures, the carbonic-acid pipe has two branches $r\,r'$, which enter the charger on two sides and discharge the carbonic acid more or less in the direction of the current in the charger.

$o$ is a pipe or rubber tube leading from the top of the separator C to the charger B and entering the same between the check-valve $d$ and the nozzles $r\,r'$ through a nozzle $t$.

Fig. 4 shows a differently-constructed charger, the gas being injected at the end of the same through a valve V, with adjustable opening, the beer entering and leaving as indicated by arrows.

Fig. 5 shows another modification of the charger, in which M and N are two parts of a casing with an interposed foraminous diaphragm O, of wire-gauze or other suitable material and $u$ $u$ nozzles for injecting carbonic acid into the current in the chamber formed by the part M of the casing and the diaphragm O.

We supply beer from a cask—such as the cask A—at a fixed elevation above the carbonic-acid charger B and above the discharge-valves $j$, so as to have a substantially constant head of liquid above the charger, which head is larger than the vertical distance between the charger and the racking-cocks $j$, so that by opening the cocks $j$ the beer is caused to flow through the apparatus. In practice we maintain at the charger from ten to twenty-five pounds pressure per square inch, by preference about twenty pounds. The pressure in the bunged kegs should be about from five to eight pounds. When it is inconvenient to supply beer from a higher level, we obtain the same result—namely, a substantially constant head—by maintaining upon the surface of the beer in the cask A gas-pressure (air-pressure or carbonic-acid pressure) in the usual well-known manner. From the charger B we discharge the beer against a fluid-resistance smaller than the fluid-pressure of supply, so that whenever the discharge-cocks $j$ are opened a current is established from the cask A to the place of discharge. Into the current thus produced we inject carbonic-acid gas at the charger B, the pressure of the gas being so regulated as to prevent complete saturation of the beer at the pressure and temperature at the charger, as beer fully charged would be too much charged when the pressure decreases or the temperature is raised, as it generally is when the beer reaches the discharge. Any overcharging of the beer causes it to foam and strain the packages into which it may be placed. It is also important that the beer should not arrive fully charged at the filter, as the disengagement of gas due to the reduction of pressure would seriously interfere with the operation of the filter. To insure complete absorption of the injected carbonic acid, the current from the charger B may be passed to a separator C through a hose $f$ at least fifty feet long, one and one-half inch hose being generally used. The hose $f$ is attached to and enters the cask or separator C at the top, while the beer passes off at or near the bottom through the hose $g$, leading to the filter D. Within the separator such carbonic-acid gas as may not have been absorbed separates from the liquid and is by preference returned through pipe $o$ and nozzle $t$ into the fresh current of beer between the check-valve $d$ and the carbonic-acid nozzles $r$ $r'$. As shown, the nozzle $t$ discharges in the direction of the current, so that the gas from the return-tube $o$ is drawn into the current whenever the velocity in the charger is sufficient. Instead of returning the unabsorbed gas into the current of beer it may occasionally be discharged through a blow-off cock $v$ on the separator. The flow of carbonic acid is regulated by the reducing-valve and by the valve $n$. The reducing-valve we generally adjust to close at a pressure of about forty pounds to the square inch; but when the current is turned on the gage $p$ will generally indicate about twenty pounds, about the same as the pressure due to the total head. The proper adjustment is readily made by a practical brewer.

The filter may be dispensed with, also the separator. We prefer, however, to use both apparatus.

We do not in this specification claim any specific construction of the charger, which may be varied in form.

What we claim as our invention, and desire to secure by Letters Patent, is—

1. The continuous method of preparing beer for the market, consisting in supplying ruh-beer from a vessel to a carbonic-acid charger under a substantially constant head, causing a current to flow from the vessel to the charger by allowing the beer to be discharged through a pipe against a fluid-resistance smaller than the pressure due to the constant head, injecting carbonic acid into the current thus produced in the charger, and passing the mixed beer and carbonic acid through a separator and through a filter and discharging the same, substantially as specified.

2. The continuous method of preparing beer for the market, consisting in supplying ruh-beer from a vessel to a carbonic-acid charger under a substantially constant head, causing a current to flow from the vessel to the charger by allowing the beer to be discharged through a pipe against a fluid-resistance smaller than the pressure due to the constant head, injecting into the current thus produced in the charger carbonic-acid gas under constant pressure so regulated as to prevent complete saturation under the conditions of pressure and temperature of the charger, and passing the mixed beer and carbonic acid on its way to the place of discharge through a separator, substantially as specified.

3. The continuous method of preparing beer for the market, consisting in supplying ruh-beer from a vessel to a carbonic-acid charger under a substantially constant head, causing a current to flow from the vessel to the charger by allowing the beer to be discharged through a pipe against a fluid-resistance smaller than the pressure due to the constant head, injecting into the current thus produced in the charger carbonic-acid gas under constant pressure so regulated as to prevent complete saturation under the conditions of pressure and temperature at the charger, and passing the mixed beer and carbonic acid through a pipe and discharging the same, substantially as specified.

4. The continuous method of preparing beer for the market, consisting in passing ruh-beer from a vessel through a pipe under substantially constant head, injecting carbonic-acid gas into the beer in the pipe, passing the mixed beer and carbonic acid through a pipe against a resistance less than the pressure of the mixed beer and carbonic acid, and discharging it, substantially as specified.

5. In an apparatus for impregnating beer with carbonic acid, a vessel containing beer, a carbonic acid charger, a pipe or hose connecting the vessel with the charger, means, substantially as described, for producing a substantially constant pressure at the charger, one or more nozzles for injecting carbonic acid into the current passing through the charger, a separator, a pipe or hose leading from the charger to the top of the separator, and an outlet at or near the bottom of the separator connected with a pipe or hose for carrying off the charged beer, substantially as shown and described.

6. In an apparatus for impregnating beer with carbonic acid, a vessel containing beer, a carbonic-acid charger, a pipe or hose connecting the vessel with the charger, means, substantially as described, for producing a substantially constant pressure at the charger, a check-valve at or near the charger, one or more nozzles for injecting carbonic acid into the current passing through the charger, a separating-vessel, a pipe or hose leading from the charger to the top of the separator, a pipe or hose leading from near the bottom of the separator to a filter, and a pipe or hose leading from the filter to the place of discharge, substantially as shown and described.

7. In an apparatus for impregnating beer with carbonic acid, a vessel containing beer, a carbonic-acid charger, a pipe or hose connecting the vessel with the charger, means, substantially as described, for producing a substantially constant fluid-pressure at the charger, a check-valve at or near the charger, one or more nozzles for injecting carbonic acid into the current passing through the charger, a separating-vessel, a pipe or hose leading from the charger to the top of the separator, a pipe leading from the top of the separator back into the charger between the check-valve and the injecting-nozzles, and an outlet at or near the bottom of the separator for carrying off the charged beer, substantially as shown and described.

In testimony whereof we have signed our names in presence of two witnesses.

JOHN B. STOBAEUS.
FREDERICK C. WACKENHUTH.

Witnesses:
ANDREW L. HALL,
HERMAN C. H. HEROLD.